United States Patent Office 3,488,954
Patented Jan. 13, 1970

3,488,954
DUAL SPEED STEERING SYSTEM
William G. Thomas, Charlottesville, and Charles R. Wesner, Crozet, Va., assignors to Sperry Rand Corporation, a corporation of Delaware
Filed June 4, 1968, Ser. No. 734,443
Int. Cl. F15b *15/18, 13/16;* B63h *25/22*
U.S. Cl. 60—52　　　　　　　　　　　　　　　　6 Claims

ABSTRACT OF THE DISCLOSURE

A dual speed electro-hydraulic rudder control system for marine vessels wherein a source of fixed velocity hydraulic fluid having a dump valve for establishing low and high flow velocity outputs is controlled by an error signal from a single electronic amplifier through control switches having low and high threshold energization values, said low threshold switch controlling a directional control valve to control the direction of movement of the rudder while the high threshold switch closes said dump valve whereby to increase the fluid flow velocity through the directional control valve.

Background of the invention

The present invention relates to electro-hydraulic steering gear for marine vessels and more particularly to such gear which may be automatically controlled to position the rudder of the vessel in accordance with deviations from a desired course or manually positioned, for maneuvering and docking for example. More specifically, the invention relates to an electro-hydraulic steering system wherein the rudder is automatically operated at more than one speed depending upon the magnitude of the error signal controlling the same. For example, during normal course keeping where rudder commands are relatively low, a low speed rudder operation is provided. However, during maneuvering such as in harbors and docking where large rudder angles are required in a short period of time, i.e. in response to large orders, the system automatically shifts to higher rudder speed operation.

Multiple speed electro-hydraulic ship steering systems are well known in the art. For example, variable delivery pumps have been used for providing proportional speed control and have proved to provide smooth stepless response. However, these systems tend to be very expensive and are relatively complex and hence more subject to malfunction. More recently, electro-hydraulic steering systems of relatively low cost have been developed which use fixed delivery vane pumps, solenoid controlled directional valves and clevis mounted cylinders. These systems have proved very rugged but have the disadvantage that they do not provide dual speed control without extensive and expensive modifications such as dual pumps, dual directional valves, dual amplifiers, etc. Various arrangements and combinations of the foregoing have been employed but due to their complexity are expensive to manufacture, install and maintain and are inherently unreliable.

Summary of the invention

In accordance with the teachings of the present invention there is provided a single, fixed delivery pump system, directional control valve means, rudder operating cylinders, e.g. clevis mounted cylinders controlled by a single solid-state electronic amplifier responsive to the difference between the rudder order signal and a rudder angle feedback signal, the output of which amplifier is supplied to two independent control valve means. The dual rudder speed is obtained by diverting a portion of the hydraulic flow from the fixed delivery pump back to the sump, i.e. exhaust, through a flow control-dump valve assembly. The one output of the amplifier is polarity sensitive and controls a direction control valve while the other output of the amplifier controls the dump valve assembly.

The performance of the system of the present invention is substantially as good as the variable delivery system and provides small rudder increments for good course keeping in the automatic modes while providing fast hard-over-hard-over times in hand-electric modes for maneuvering and docking. Further advantages of the present system include a much lower initial cost, lighter weight, is less susceptible to damage from contaminated fluid, easier and less costly to service since there are fewer component parts and hence is more reliable.

Brief description of the drawing

A preferred embodiment of the present invention is schematically set forth in the accompanying single figure drawing designated 1a and 1b.

Description of the preferred embodiment

Figure 1A:
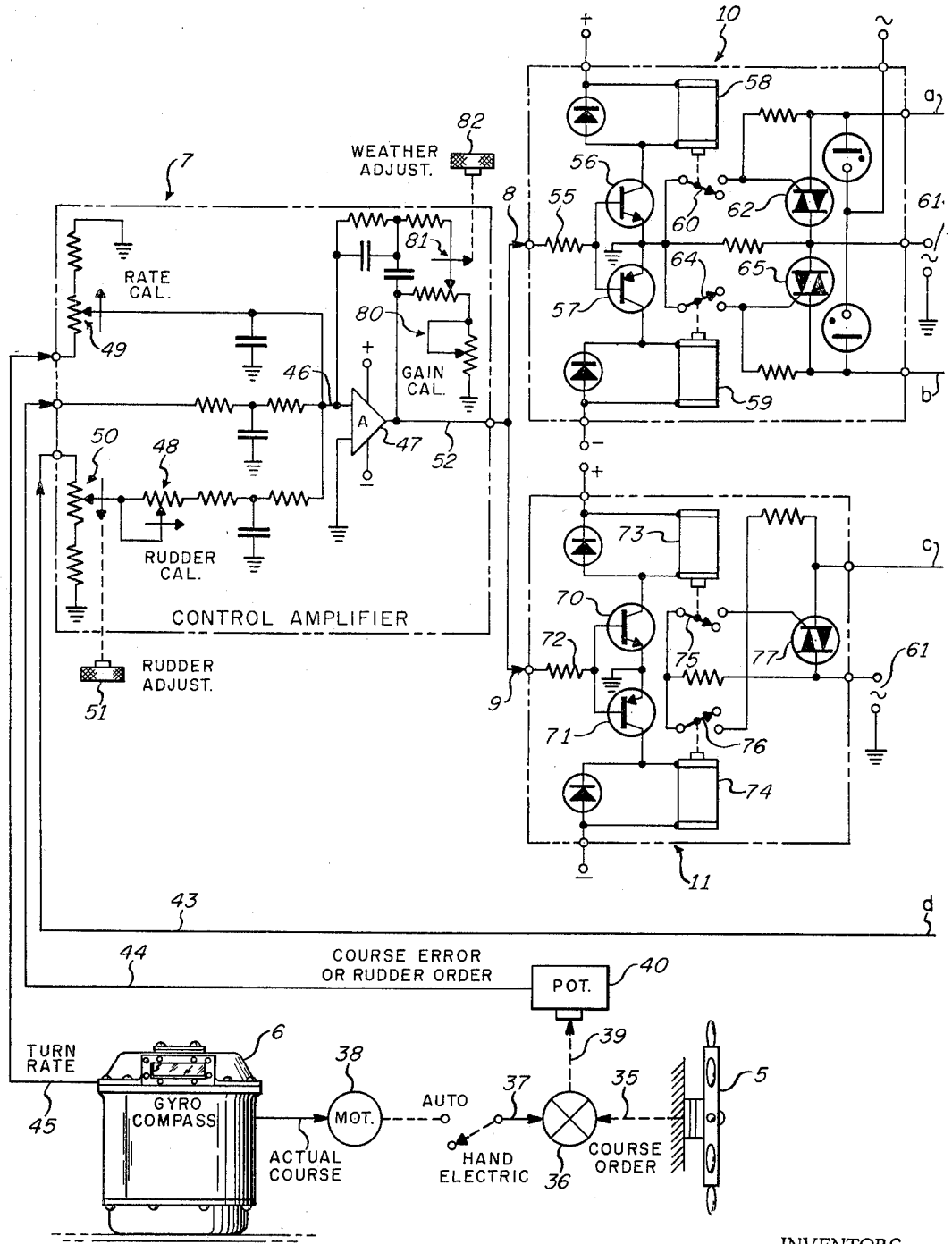
Figure 1B:
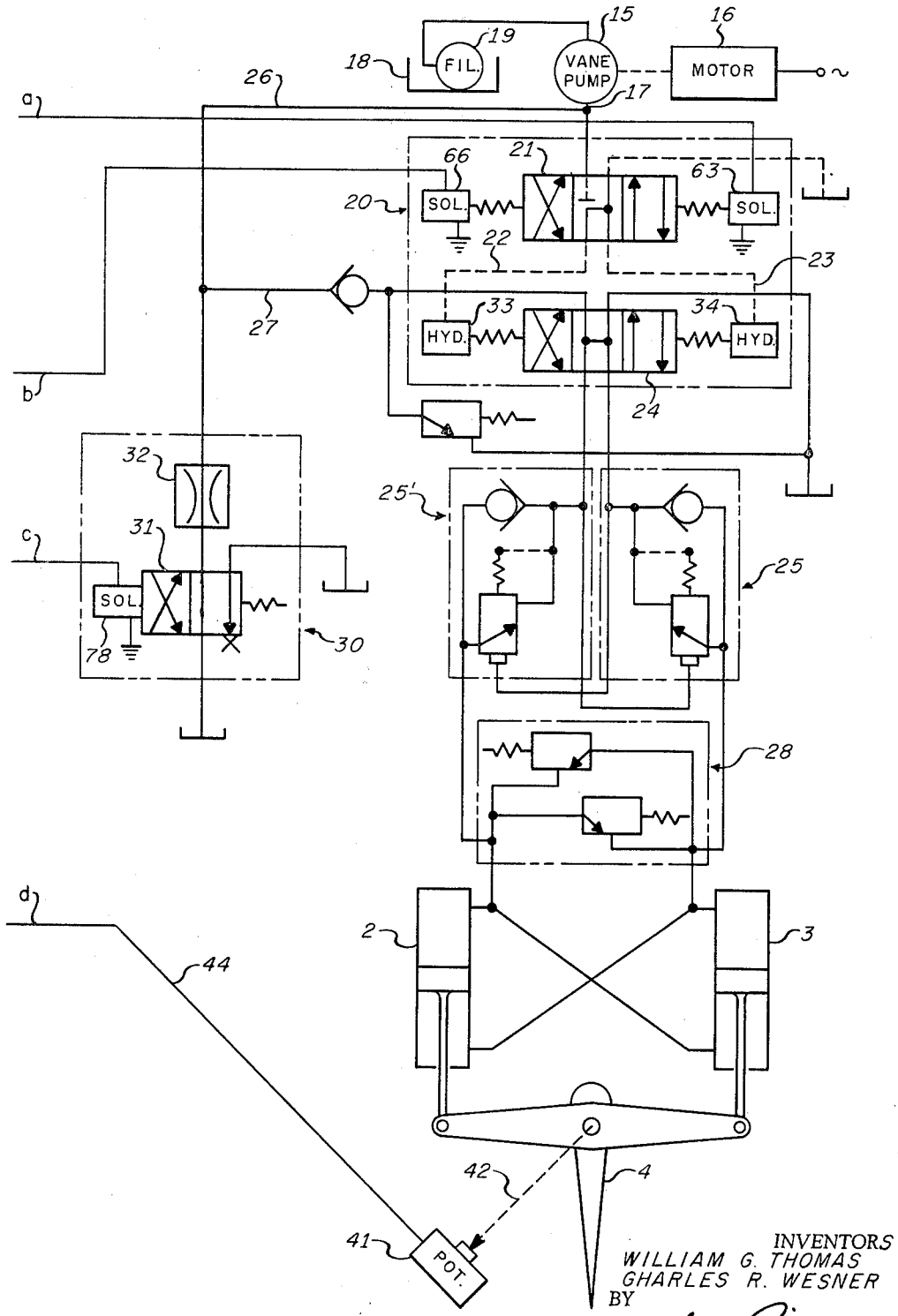

The preferred embodiment of the ship steering system incorporating the teachings of the present invention comprises basically a hydraulic actuator control system 1, incorporating clevis mounted actuator cylinders 2 and 3 for positioning the ships's rudder 4, and a steering stand (which may be of the general type shown in applicants assignee's U.S. Patents 2,796,576 or 2,719,502) incorporating manual and/or automatic steering inputs as by wheel 5 and/or compass 6, and a single solid-state electronic amplifier 7 supplying dual outputs 8 and 9 for controlling dual valve control switching modules 10 and 11 respectively. The hydraulic control system 1 comprises a fixed delivery vane pump 15 driven by a suitable electric motor 16 which supplies at its output 17 a fixed velocity flow of hydraulic fluid over suitable interconnecting hydraulic lines. The input of the pump is supplied from a hydraulic reservoir or sump 18 through suitable filter 19 in accordance with conventional practice.

In the illustrative embodiment of the present invention all of the hydraulic elements, such as control valves, relief valves, lines, etc. are illustrated schematically in accordance with standard hydraulic schematic representations, the mechanical details of which are well known in the art. The direction of flow of hydraulic fluid from the pump 15 to the rudder actuator cylinders 2 and 3 is controlled by a directional control valve means 20. This valve means includes, usually in one valve housing, an electrical solenoid controlled low pressure directional pilot valve 21 and a hydraulically controlled high pressure or main directional control valve 24. Pilot valve 21 controls the direction of flow of pilot pressure fluid over lines 22, 23 to the hydraulic valve actuators 33 and 34 of high pressure directional control valve 24. High pressure fluid is supplied by valve 24 to rudder actuator cylinders 2 and 3 through conventional counterbalance control valves 25 and 25'.

Much of the hydraulic shock normally encountered in on-off fixed-delivery hydraulic systems of the present type, is eliminated by the use of open-center directional control valves, particularly main valve 24. With this type of valve, the counterbalance valves 25 and 25' serve to hold the rudder in its commanded position and also to prevent the rudder from overhauling, i.e., rudder taking charge due to load and running faster than hydraulic flow demands.

High pressure fluid is supplied from the pump 17 to the directional control valve 24 through hydraulic lines 26 and 27, suitable check valve to establish pressure to operate the directional valve, and relief valve being provided to protect the system. Additionally, suitable cross line relief valves within valve assembly 28 are provided to protect the rudder and cylinders when counterbalance valves 25 and 25' are closed.

In accordance with the teachings of the present invention the dual speed output of the hydraulic system is obtained by diverting part of the constant delivery pump flow back to the sump through a flow control-dump valve assembly 30. The latter assembly comprises a solenoid actuated valve 31 and a flow control element 32. In the position shown valve 31 is open and a portion of the vane pump flow on line 26 is by-passed to sump thereby reducing the pump flow at the input of directional control valve 24. Therefore, when control valve 24 is actuated, rudder 4 is positioned in one direction or the other through actuators 2 and 3 at a relatively slow rate in accordance with this reduced fluid flow. When valve 31 is actuated on the other hand, the by-pass flow is blocked whereby to increase the fluid flow through valve 24 to thereby drive the rudder at a higher rate. Thus by this arrangement the hydraulic system is capable of driving the rudder 4 at a dual speed.

The electrically actuated directional control valve means 20 and electrically actuated velocity control valve means 30 are controlled in accordance with an electrical error signal by the apparatus now to be described. A course error or rudder order signal is generated by means of a steering wheel or helm 5 operating through one input 35 of differential 36, the other input 37 of which is either fixed or positioned automatically in accordance with the actual course of the vessel as determined by a suitable motor 38 positioned in accordance with the output of a course reference device, such as a gyrocompass 6. The condition of the input 37 of differential 36 is dependent upon whether it is desired to operate the system in an automatic or hand-electric mode, herein schematically illustrated by a correspondingly labeled switch which may be for example a manually operated clutch mechanism. This arrangement may be similar to that shown in the above mentioned Patents 2,719,502 or 2,796,576.

The output 39 of differential 36 positions the wiper of a potentiometer 40 from which is derived an electrical signal proportional to the course error or rudder order. The rudder position feedback required for closing the over-all servo loop is derived from a suitable feedback potentiometer 41 mechanically positioned in accordance with the displacement of the rudder from a neutral or zero position as by means of mechanical connection 42. If desired, conventional course rate damping may be provided by any of a number of accepted means, and, in the present embodiment, such rate of turn signal is derived from a rate generator (not shown) activated by gyrocompass 6.

The rudder order and rudder feedback signals appearing on leads 43 and 44 respectively, together with the turn rate signal on lead 45, are applied as inputs to a single solid-state control amplifier 7 wherein they are suitably smoothed and algebraically summed to provide an error signal at the input 46 of a conventional signal amplifier 47. A rudder calibration potentiometer 48 may be provided for determining the degrees of rudder travel per volt of feedback signal whereby to adapt the system to the characteristics of a particular vessel. A similar calibration potentiometer 49 may be provided for adjusting the rudder travel per vessel turning rate. A further adjustment may be provided, usually available to the helmsman, for adjusting the performance of a particular vessel under varying operating conditions, as by means of a further potentiometer 50 positioned by suitable knob 51 outside of amplifier 7. Thus, amplifier 47 provides an output signal which varies in accordance with the system error, i.e. proportional to the algebraic sum of the rudder order and rudder position signals. Such signal is therefore a measure of the error between the desired and actual position of rudder 4.

In accordance with the teachings of the present invention control amplifier 7 provides an output on lead 52 which controls valve control switch module 10 and valve control switch module 11. The former output is applied through a dropping resistor 55 to the bases of a pair of polarity sensitive transistors 56 and 57, transistor 56 being an N-P-N type and therefore rendered conductive on a positive going signal and transistor 57 being a P-N-P type and therefore rendered conductive on a negative going signal. The threshold voltage of transistors 56 and 57 is determined at least in part by resistor 55. Each of the transistors 56 and 57 includes in its collector circuit a relay 58 and 59 respectively. Relay 58 is energized upon conduction of transistor 56 and operates switch 60 thereby applying a triggering voltage from AC source 61 to triac 62 whereby triac 62 conducts to energize solenoid 63 on directional control valve 21. In the same manner, when relay 59 is energized, switch 64 triggers triac 65 to thereby energize solenoid 66 on directional control valve 21.

Valve control switching module 11 is very similar to switching module 10 and includes N-P-N transistor 70 and P-N-P transistor 71, the bases of which are also energized by output 52 of control amplifier 7 through dropping resistor 72 of considerably greater value than resistor 55 to thereby establish a higher conductance threshold for transistors 70 and 71. Relays 73 and 74 in the respective collector circuits of transistors 70 and 71 when energized, operate switches 75, 76 to trigger a single triac 77 independently of the polarity of the input signal. Triac 77 serves to supply energizing voltage from source 61 to solenoid 78 of dump valve 31. As stated, the voltage threshold level of switching module 11 is established at least in part by the impedance 72 which is higher than the threshold voltage of switching module 10 by a predetermined amount.

In summary, the operation of the system is as follows. The rudder order signal from potentiometer 40 and the rudder position follow-up signal from potentiometer 41 are algebraically summed and any difference therebetween causes an error current to flow into amplifier 47 to thereby produce an error voltage at the output lead 52 of control amplifier 7. When this error voltage is of one sense or polarity and reaches a predetermined low or first threshold value, for example +1 volt, transistor 56 conducts thereby energizing relay 58 and operating triac 62 which energizes solenoid 63 on directional control pilot valve 21. Valve 21, in turn, operates main directional control valve 24 through its hydraulic solenoid 33 to thereby drive the rudder 4 at a minimum speed until the error current is reduced to null, i.e., until the rudder position equals its ordered position. If the error voltage is of the opposite sense, transistor 57 would operate and cause an opposite operation of the hydraulic system and an opposite movement of the rudder.

If, however, the error voltage at the output of amplifier 7 exceeds a second predetermined threshold value, transistor 70 will conduct and cause relay 73 to operate to thereby energize the triac 77 and solenoid 78 of valve 31 which will therefore block the by-pass fluid flow from the pump 15 to the sump and thereby allow maximum pump flow through directional control valve 24 resulting in the rudder being driven at a higher rate. Again, an error voltage above the second threshold but in the opposite polarity will cause the same operation of solenoid 78 through transistor 71 and relay 74. As the error voltage is reduced toward null and hence drops below the second threshold value, dump valve 31 is again open to reduce the rudder speed as it comes into synchronism with the rudder order.

Such operation provides a performance substantially equal to a variable delivery pump system and provides fast hard-over to hard-over for maneuvering and docking and low rudder rates for smooth course keeping in both automatic and hand-electric modes of operation.

Additionally, the system provides low hydraulic shock for long life and high reliability. From a servomechanism point of view, the system permits a relatively high gain-high sensitivity operation since the rudder is automatically operating at low speed as it comes into synchronism.

Amplifier gain calibration potentiometer 80 serves to establish the rudder dead zone. In other words, it, together with resistance 55 establishes the first switching threshold. Similarly, a weather adjustment is also provided and in the present arrangement comprises a potentiometer 81 which may be positioned by the operator through suitable knob 82. The weather adjustment also controls the over-all amplifier gain and establishes a manually selectable rudder dead zone for the existing weather conditions.

Thus by the present invention, we have provided a ship steering system embodying two output switching modules operated at different thresholds from a common amplifier which provides automatic hydraulic speed change as a function of system error, the latter being accomplished by means of a relatively simple flow control-dump valve arrangement for varying the input flow rate to the directional control valves of the hydraulic steering unit.

While the invention has been described in its preferred embodiment, it is to be understood that the words which have been used are words of description rather than limitation and that changes within the purview of the appended claims may be made without departing from the true scope and spirit of the invention in its broader aspects.

We claim:
1. An improvement in ship steering systems of the type having a hydraulic actuator for positioning the ship's rudder, a hydraulic pump, electrically actuated directional control valve means coupled between said pump and said actuator for controlling the direction of movement of said rudder, and electrical means for providing rudder order and rudder position signals, wherein the improvement comprises:
   (a) a fixed delivery hydraulic pump,
   (b) electrically actuated velocity control valve means coupled with said fixed delivery pump for providing first and second fixed flow velocities from said pump to said directional control valve means,
   (c) a single amplifier responsive to said rudder order and rudder position signals for supplying a control signal proportional to the algebraic sum of said signals,
   (d) means responsive to first and second predetermined threshold values of said control signal for providing corresponding first and second control valve outputs, and
   (e) means for controlling said directional control valve means in accordance with said first output and for controlling said velocity control valve means in accordance with said second output.

2. The steering system as set forth in claim 1 wherein said velocity control valve means includes a dump valve responsive to the fluid flow from said fixed delivery pump and wherein in one position dumps a portion of said fluid flow to exhaust to provide a low flow velocity to said directional valve and in the other position blocks said exhaust flow to provide a high flow velocity to said directional valve.

3. The steering system as set forth in claim 1 wherein said amplifier means comprises circuit means for algebraically summing said rudder order and rudder position signals, a solid-state amplifier responsive to said sum signal and having adjustable means for controlling the gain thereof for establishing the valve of said first threshold.

4. The steering system as set forth in claim 3 wherein said gain control means includes further adjustable means adapted to be set in accordance with prevailing weather conditions.

5. The steering system as set forth in claim 1 wherein the means for providing said first and second control valve outputs comprise respectively a pair of polarity sensitive transistors, a pair of relays controlled thereby and switch means controlled from said relays for energizing said directional and velocity control valves respectively, and means coupling said sum signal to said first and second pairs of transistors at different energy levels.

6. A dual speed steering system for marine vessels having a rudder for controlling the course thereof comprising:
   (a) hydraulic actuator means for positioning said rudder and means for providing an electrical signal corresponding to the position thereof,
   (b) a fixed delivery hydraulic pump means for providing a fixed velocity fluid flow,
   (c) electrically controlled directional fluid flow control valve means coupled between said pump means and said actuator means for controlling the direction of fluid flow therebetween to thereby move said rudder in one direction or the other,
   (d) a two position, electrically controlled fluid velocity control valve means coupled with said pump means, the one position of which provides a relatively low velocity of fluid flow from said pump means to said directional control valve means and the other position of which provides a relatively high velocity of fluid flow from said pump means to said directional control valve means,
   (e) means for providing an electrical rudder order signal corresponding to a desired rudder position,
   (f) a single amplifier responsive to said rudder order and rudder position signals for providing an output control signal proportional to the difference in magnitude therebetween, and
   (g) first and second switch means responsive to said control signal and having predetermined low and high switching thresholds respectively, said first switch means controlling the position of said directional valve and said second switch means controlling the position of said velocity control valve, whereby for low values of said control signal said rudder is driven in one direction or the other at a slow rate while for higher values of said control signal said rudder is driven at a higher rate.

References Cited

UNITED STATES PATENTS

| 2,583,197 | 1/1952 | Armington | 60—52 XR |
| 2,614,644 | 10/1952 | Gustafson | 60—52 XR |
| 2,864,239 | 12/1958 | Taylor | 60—52 XR |
| 3,099,327 | 7/1963 | McAdams | 60—52 XR |
| 3,249,174 | 5/1966 | Orwig | 60—52 XR |

EDGAR W. GEOGHEGAN, Primary Examiner

U.S. Cl. X.R.
91—361; 114—150